July 24, 1956 D. W. EPSTEIN 2,756,415
SCHMIDT TELEVISION PROJECTOR ARRANGEMENT
Filed June 1, 1949 2 Sheets-Sheet 1
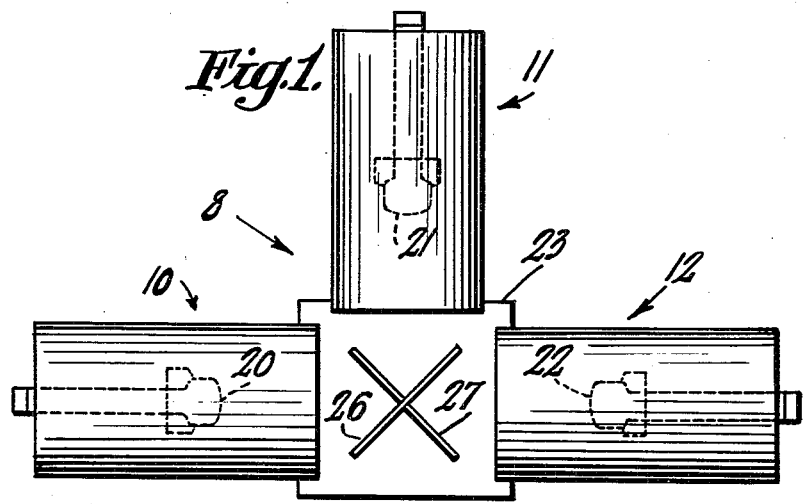
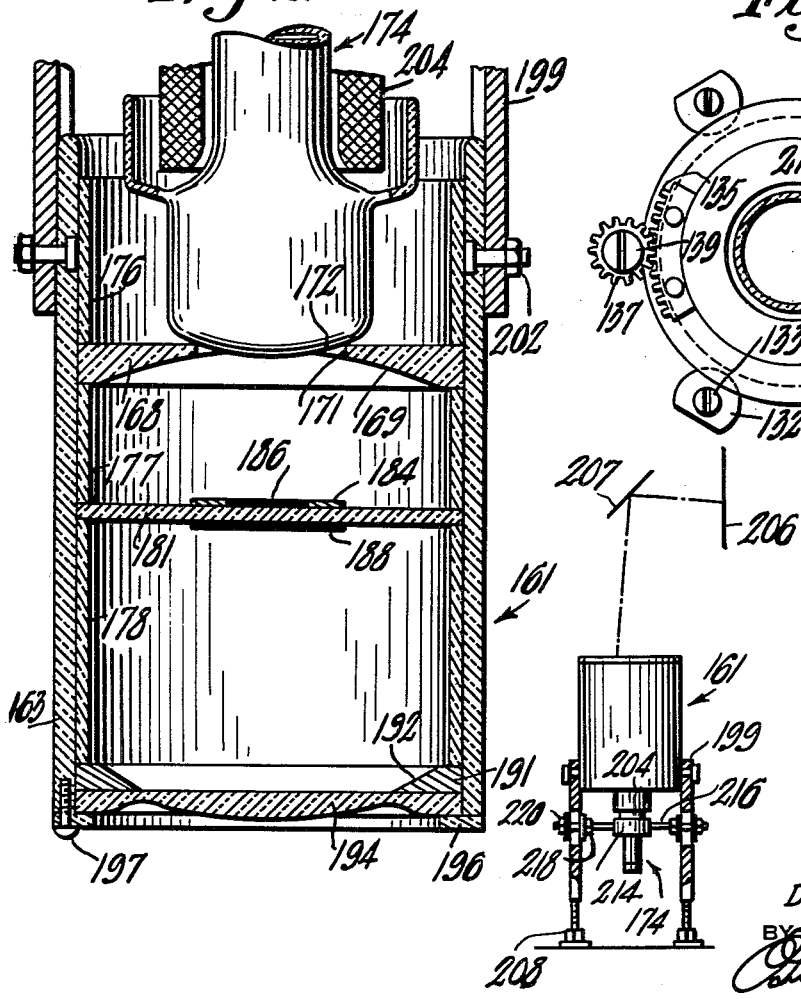
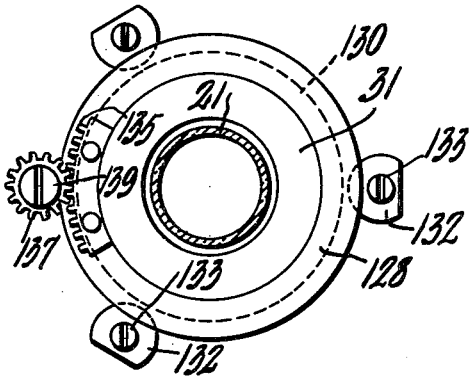
INVENTOR
DAVID W. EPSTEIN
BY
ATTORNEY

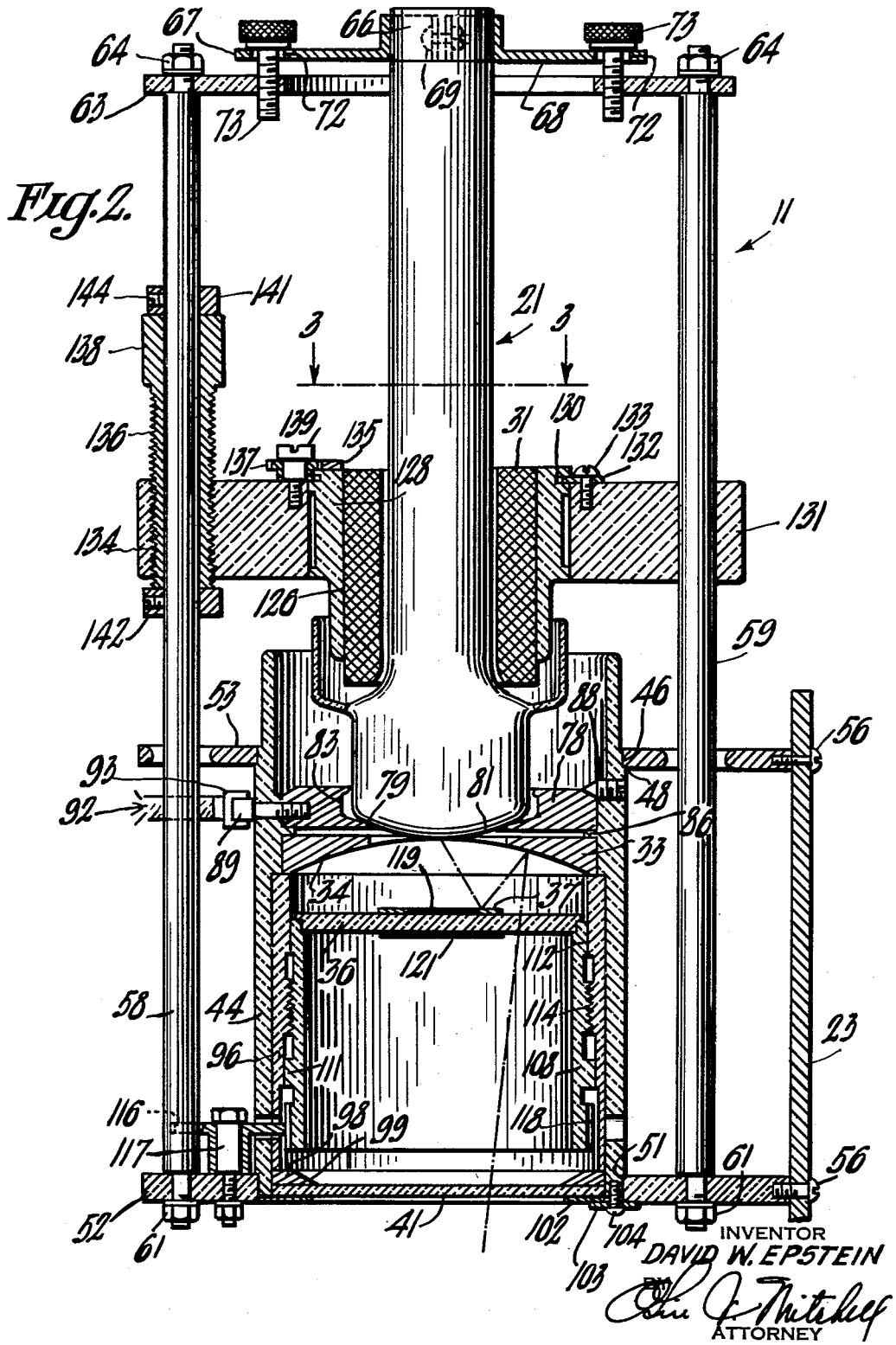

United States Patent Office 2,756,415
Patented July 24, 1956

2,756,415

SCHMIDT TELEVISION PROJECTOR ARRANGEMENT

David W. Epstein, Princeton, N. J., assignor to Radio Corporation of America, a corporation of Delaware Application June 1, 1949, Serial No. 96,551

3 Claims. (Cl. 340—370)

The present invention relates to projectors for projecting images produced by an image producing tube, and more particularly, though not necessarily exclusively, to a novel projector comprising a spherical mirror, an aspheric zone plate and a plane reflecting surface optically located between the image producing surface of a cathode ray tube and the spherical mirror. The invention is also concerned, in one of its aspects, with the provision of an improved multiple projector for projecting television images in color, for example.

In accordance with the invention, the parts of an optical projector are assembled in a unitary structure which is compact; which is relatively inexpensive from the standpoint of manufacturing and assembly costs; and which is of such nature that the parts remain in the desired position of adjustment by reason of structural features of the invention. Also the projector of this invention protects all of the optically active surfaces and is substantially dust proof.

In a projector embodying features of the invention in one form, the projector is substantially self-contained and is housed within a cylindrical member which serves as a housing and as a positioning member for substantially all of the projector parts. This member also aids in locating supporting means for mounting a cathode ray tube in position to cooperate with the optical parts of the projector.

The aim or object of the invention is to provide a novel projector in which the optically active surfaces of the optical parts are protected from dust.

Another object is to provide a projector in which the parts are nested in a novel manner within a cylindrical housing, the latter providing the principal support for these parts.

A further object of the invention is to provide a novel focusing means together with a novel control means for said focusing means.

Still another object is to provide a novel multiple projector.

A still further object is to provide a novel means for insulating the high electrical potential connection to the cathode ray tube in a projector and for minimizing the possibility of discharge in and around the projector.

Other objects and advantages of the invention will, of course, become apparent and immediately suggest themselves to those skilled in the art to which the invention is directed from a reading of the following specification in connection with the accompanying drawings in which:

Fig. 1 of the drawing shows diagrammatically the general organization of a television projection system embodying the invention in illustrative form;

Fig. 2 of the drawing is a view in sectional elevation of a projector unit of Fig. 1, the section being taken substantially along line 2—2 of Fig. 1;

Fig. 3 is a sectional view in plan, the section being taken on line 3—3 of Fig. 2 as viewed in direction of the arrows;

Fig. 4 is a transverse vertical section of a projector embodying the invention in another form; and Fig. 5 is a view disclosing the projector unit of Fig. 4 in conjunction with a focusing support and a viewing screen.

Referring to Fig. 1 of the drawing, the organization of the television projection system of the invention is designated generally by reference character 8. This organization or system is seen to comprise three projectors 10, 11 and 12 for projecting an image toward a viewing screen, for example (not shown). The final optical axes of these projectors coincide to provide a single registered image to be viewed. Each projector receives light from its respective image producing device such as a cathode ray tube. Three such tubes are provided in the illustrative example of Fig. 1 designated 20, 21 and 22. A suitable common support such as an extension of the plate 23 appearing in Fig. 2 of the drawing, is provided for the projectors 10 to 12 and this support is, or may be, provided with means to position dichroic mirrors 26 and 27. Suitable dichroic devices are known to those skilled in the art. The details of the surface coating of the mirrors 26 and 27 do not directly form a part of this invention, but for the sake of completeness of description, reference is made to an article by G. L. Dimmick entitled, "A New Dichroic Reflector and its Application to Photocell Monitoring Systems," beginning on page 36 of the "Journal of the Society of Motion Picture Engineers" for January 1942.

All of the tubes 20 to 22 may operate continuously and simultaneously at any selected field or frame repetition rate so that the combined viewed image is the result of the simultaneous operation of all of the tubes. On the other hand, without departing from the intent of the invention, the various tubes 20 to 22 may operate in sequence so as to produce the observable final color or other images or patterns in a sequential manner, as is customary with the so-called sequential type of color television system. In this latter form of operation a suitable operational cycle for the tubes is usually established so that while each tube produces a field of the composite polychrome or multicolor image in one selected color, for instance, it will, in the double interlace system, alternately produce in its successive operational periods the line traces representing first the even lines and then the odd lines, and so on. It will be understood that the choice of component colors in which the images are to be recreated and the exposure sequence of the selected colors will depend entirely upon the color system for which the projector is used. Since the mode of operation and details of such color systems as the above mentioned simultaneous and sequential types are not a part of the present invention, they are not illustrated nor will they be further described. Technically in a polychrome television system it is largely immaterial as to what type of luminescent compounds are used to coat the screen or target areas of the several cathode ray image producing tubes 20 to 22. Good quality color can be had where all tubes use a luminescent compound to create the several component color images in black and white monochrome inasmuch as the invention disclosed herein includes appropriate component color filters. In many instances, however, the tubes may have the screen or target area coated with luminescent compounds which tend to produce light of the selected component color so that the color filter system to be described hereinafter, receives aid from the image light course, in this instance the cathode ray tubes, in performing their separating function. Also, certain elements of the optical systems may be selectively reflective to aid in color selection. The following three phosphors produce light of colors quite suitable when added together to produce substantially white light. Zinc orthosilicate (willemite) for green. Calcium magnesium silicate, titanium activated for blue. Cadmium borate for red.

To refer to one suitable and illustrative form of arrangement which has been found satisfactory in operation, and which is represented by the illustrative arrangement shown by way of example, the tube 21 will be assumed to operate under control of green image signals. The tube 20 will be assumed to operate under control of blue image signals.

Each of the tubes 20 to 22 is provided with a deflecting yoke 31 (shown conventionally) for producing deflection of the cathode ray beam in a well known manner. Suitable yokes may be constructed as described in United States Patent No. 2,428,947, granted to C. E. Torsch on October 14, 1947.

While employment of the multiple projector of this invention for projecting color images to form a colored television image has been discussed in the foregoing, it will be understood the tubes 20 to 22 may each produce and project the same image in substantially the same color to give a monochrome image upon a screen so that greater light intensity of the projected image is obtained. The suggested television uses of the invention herein described are in nowise to be construed as restrictive of a more general use of the invention.

The optical systems for the three projectors will now be described. Each system or optical light path, considered separately, is, in general, of the bireflective type disclosed in United States Patent No. 2,295,799, granted September 12, 1942. The overall operation of the multiple projector disclosed herein as well as the optical systems associated with the tubes 20 and 22 are modified by the dichroic mirrors 26 and 27.

The reflective optical system or projector for the tube 21 will now be described in detail by way of example since its structure is, or may be, the same as that employed for the tubes 20 and 22. Referring to Figs. 2 and 3 of the drawing, it will be seen that the projector 11, for example, comprises a spherical mirror 33 having a spherical reflecting surface 34, a member 36 providing a plane reflecting surface 37 in a manner to be described and an aspherical zone plate 41. In the illustrative arrangement, the tube 21 operates under control signals representing green portions of the original image. Selective reflection and transmission dichroic system permits green light from the tube 21 to reach the screen.

The structural arrangement of the projector 11 in accordance with the invention is such that a compact and readily manufactured arrangement is provided. The optical parts, set forth above, are carried and positioned by a tubular member or barrel 44 which is formed from an insulating material such as Bakelite or the like. This barrel has a reduced section 46 providing a shoulder at 48. Its end is reduced and the diameter shown to provide shoulder 51. A plate 52 seats over the reduced end of the barrel 44 against the shoulder 51. A second plate 53 seats over the barrel against the shoulder 46. The plates 52 and 53 are secured to the previously mentioned base or support 23 for the several members by means of screws 56. It will be understood that the projector 11 may be used as a separate independent projector in which case the plate or support 23 may terminate at or adjacent the plate 52. Rods 58 and 59 each have reduced threaded ends which are received in suitable holes in the plate 52. Each rod is secured to the plate in a suitable manner as by nuts 61. The end of each rod 58 and 59 opposite to its connection to the plate 52 carries a plate 63 secured to the rods by nuts 64. A holder for the base 66 of the tube 21 comprises two parts 67 and 68 which may be clamped together, for example, by bolts and nuts 69 to form a collar clamped to the tube base. The parts 67 and 68 project outwardly from the tube base in the form of arms each having an enlarged aperture 72. Thumbscrews 73 engaged in tapped holes in the plate 63 pass through these apertures which allow for lateral adjustment of the base of the tube 21. The screw 73 provides a means for applying an axial thrust on tube 21. A metallic member 78 in the form of relatively thick disc provides a circular seat for the substantially spherical target face 81 of the tube 21. A circular recess 83 surrounds the end of the tube. Upon tightening the screws 73, it will be seen that the tube face 81 is thrust against the circular seat 79 to accurately position the tube with respect to the optical elements of the projector. The barrel 44 is provided with a circular ridge 86 which separates the spherical mirror 33 and the metallic member 78. These members are readily inserted from their respective ends of the barrel 44. The member 78 is held in place by means of a screw 88 cut off or otherwise formed from insulating material. An electrical connecting stud 89 is received in a tapped hole, for example, in the conductive member 78 and it extends outwardly to an aligned hole in the insulating barrel 44. A high voltage cable 92 is connected to the stud 89 through a connecting member 93 which has a smooth exterior surface designed to minimize possibility of corona discharge at this point. A conductive ring is around the tube near its face having connection with the conductive coating on the inside of the tube. Conductive means (not shown) completes the connection from the member 78 to the conducting ring on the tube.

The spherical mirror 33, as stated above, is received wtihin a bore of suitable diameter in the barrel 44 and a tubular member 96 nested in the barrel 44 seats against the spherical mirror 33 and serves to hold it in place. A mask 98 having an aperture 99 is also seated within the bore in the cylindrical member 44 and the correcting plate 41 seats against the mask 98. The spherical mirror 33, the tubular member 96, the mask 98 and the correcting plate 41 are held in nested relationship in the barrel 44 by means of a ring 102 which is held in place by a plate 103 secured in position by a screw 104. By the construction just described, the correcting plate is automatically correctly aligned with respect to the reflecting surface 34 and at the correct optical distance.

The transparent member 36 is secured to or seated in one end of a tubular member 108 which is rotatably received in the interior of the tubular member or sleeve 96. This sleeve is provided with annular projections 111 and 112 which serve as bearings to insure proper alignment of the sleeve during angular rotation. Threads 114 on the exterior of the sleeve 108 are threadedly engaged with internal threads in the sleeve 96. Upon rotation of the sleeve 108 with respect to the sleeve 96, the transparent member 36 moves axially of the projector 11 to provide a focusing adjustment. Operation of the focusing adjustment is obtained by rotation of a pinion 116 which engages gear teeth 118 cut or otherwise formed around the periphery of the sleeve 108. A suitable stud 117 which is secured in the plate 52 provides bearing support for the pinion 116.

The transparent member 36 is rendered opaque as by blackening in the center of the reflective surface 37 as indicated at reference character 119. The opposite face of the member 36 is likewise provided with a blackened area 121 coextensive with the reflective area 37 plus the blackened area 119.

The previously mentioned deflecting yoke 31 is received in the bore 126 of a yoke holding member 128. This member 128 is rotatably received in a support member 131 preferably formed of insulating material which is slidable upon the rod 59. A groove 130 is provided in the member 128 which is engaged by fixed tongues 132 secured to the support 131 by screws 133. A toothed sector 135 secured in the holder 128 is in mesh with a pinion 137 rotatably journalled on a stud 139. The stud 139 is secured to the member 131. In order to provide for adjustment of the yoke 31 axially of the tube 21, the member 131 is provided with a threaded hole 134 which is threadedly engaged with the threaded portion 136 of an adjusting member 138 which is rotatably received on the rod 58. Collars 141 and 142 are secured on to rod 58 at each end of the member 138 by suitable means such as set screws 144. It will be seen by rotating the knurled portion of the member 138 that the yoke holding member 128 may be moved axially in either direction with respect to the neck of the tube 21.

Fig. 4 of the drawing shows another embodiment of the invention which is especially well suited for use as a single projector, such as for black and white, and for this purpose, it may be mounted somewhat as shown in Fig. 5 of the drawing, later to be described. Referring to Fig. 4 of the drawings, the projector in this embodiment, designated generally by reference character 161, comprising a tubular barrel 163 turned or otherwise formed from insulating material. This barrel 163, as shown, may be of substantially uniform diameter throughout its length and it receives a member 168 having a spherical reflecting surface 169. The member 168 is provided with a circular opening 171, the rim of which provides circular seat for the substantially spherical target end 172 of a cathode ray tube 174 which is, or may be, similar to any one of the tubes 20 to 22 discussed above except for the phosphor, which may be a white light producing phosphor. Three sleeves 176, 177, and 178 are provided which are received within the barrel 163 and serve as spacers for positioning the spherical mirror 168 and a member 181 having a transparent section, a reflecting section and two opaque sections. The latter corresponds in function to the corresponding member 36 of Fig. 2 of the drawings, but it is held in a fixed axial position by the sleeve 177 and the sleeve 178. The sleeve 176 may fit frictionally within the longitudinal opening of the barrel 163, or it may be suitably secured therein by suitable means (not shown). The member 181 is provided with a ring shaped reflecting surface 184 which surrounds a blackened area 186. A similar blackened area 188 lies opposite the blackened area 186 and the reflecting surface 184.

A mask 191 having an aperture 192 is seated against the end of the sleeve 178 and a correcting plate 194 seats against the mask 191. These last named parts are held in place by means of a ring 196 which is secured in any suitable manner as by a screw or screws 197 in the end of the barrel 163. With the construction described, the correcting plate 194 is automatically correctly aligned with respect to the reflecting surface 169 and at the correct optical distance.

The barrel 163 and the parts mounted therein carried thereby are supported on a number of legs 199. These legs are shown also in Fig. 5 and any number, for example, three may be employed. Each leg may be secured to the projector by suitable means such as the screw 202 which engages a tapped hole in the barrel 163. A deflecting yoke 204 for the cathode ray beam of the tube 174 is indicated conventionally and this yoke may be carried in any suitable way on one or more of the legs or supports 199 as described hereinafter.

Referring to Fig. 5 of the drawings, the entire projector 161 constructed as described in detail in connection with Fig. 4 of the drawings, is carried by the legs 199 so that the correcting plate 194 is in position to transmit light from the projector to a viewing screen 206. In the arrangement shown illustratively in Fig. 5 of the drawings, the plane mirror 207 directs the image rays from the projector 161 to the screen 206. The legs 199 have adjustable screw threaded supports 208 much in the manner of the legs of the camera tripod so that the projector 161 can be raised or lowered for effecting optical focus and alignment so that a sharp, clear image may be obtained on the vewing screen 206.

The previously mentioned yoke 204 may be rotatably received in a yoke holder 214 which is provided with extensions 216. Each extension is received in an elongated slot in a leg 199 and nuts 218 and 220 serve to clamp the extension 216 to the leg. The yoke 204 may serve to hold the tube in place so that its target face seats against the previously described circle 171. The yoke 204 will then be seated against the bulb of the tube rather than as shown in Fig. 4 of the drawings. It will be understood that the yoke 204 may be carried separately and adjustably by the legs 199. For example, it may be supported in a manner similar to the yoke 31 as shown in Fig. 2 of the drawing.

I claim:

1. A projector for an image appearing on the target area of a cathode ray tube comprising a spherical reflecting member, a member having a plane reflecting surface facing said spherical mirror, and a correcting plate spaced from said spherical mirror, an elongated member having a longitudinal opening for receiving said spherical reflecting member, said member having the plane reflecting surface and said correcting plate, longitudinal spacing means in said opening in said elongated member to position said correcting plate longitudinally of said elongated member in fixed relationship with respect to said spherical reflecting member, and means positioned by said spacing means for locating said member having said plane reflecting surface between said spherical reflecting member and said correcting plate, said last recited means comprising a rotatable sleeve, means on said sleeve to carry said member having the plane reflecting surface, screw thread means on said sleeve for threaded engagement with said spacing means, and means externally accessible of said elongated member for imparting rotatable movement to said sleeve.

2. A projector for an image appearing on the target area of a cathode ray tube comprising a barrel of insulating material having a longitudinal opening, a conductive member in said longitudinal opening, means for positioning said conductive member in said opening, a seat in said conductive member defining a circle to receive the curved target face of a cathode ray tube, means externally of said barrel for obtaining an electrical connection to said conductive member, a member having a spherical reflecting surface in said longitudinal opening, said last named member abutting said means for positioning said conductive member, a spacing sleeve in said longitudinal opening, said spacing sleeve being in contact with said member having the spherical reflecting surface, an apertured mask in said longitudinal opening and in abutment with said spacing sleeve, a correcting plate in said elongated opening in abutment with said mask, and means connected to said barrel to secure said correcting plate in position in said barrel.

3. A projector for an image appearing on the target area of a cathode ray tube comprising a barrel of insulating material having a longitudinal opening, a conductive member in said longitudinal opening, means for positioning said conductive member in said opening, a seat in said conductive member defining a circle to receive the curved target face of a cathode ray tube, means externally of said barrel for obtaining an electrical connection to said conductive member, a member having a spherical reflecting surface in said longitudinal opening, said last named member abutting said means for positioning said conductive member, a spacing sleeve in said longitudinal opening, said spacing sleeve being in contact with said member having the spherical reflecting surface, an apertured mask in said longitudinal opening and in abutment with said spacing sleeve, a correcting plate in said elongated opening in abutment with said mask, means connected to said barrel to secure said correcting plate in position in said barrel, a member having a plane reflecting surface, a second sleeve rotatable in said first sleeve, means to cause movement of said second sleeve longitudinally of said first sleeve upon rotation thereof, said member having the plane reflecting surface being carried by said second sleeve, and means externally of said barrel for rotating said second sleeve.

References Cited in the file of this patent

UNITED STATES PATENTS 842,314    Heeley et al. _____ Jan. 29, 1907

(Other references on following page)

UNITED STATES PATENTS

| | | |
|---|---|---|
| 2,141,317 | Sabel | Dec. 27, 1938 |
| 2,153,709 | Bournisien | Apr. 11, 1939 |
| 2,240,827 | Bangert et al. | May 6, 1941 |
| 2,295,779 | Epstein | Sept. 15, 1942 |
| 2,295,802 | Nicoll | Sept. 15, 1942 |
| 2,381,098 | Bahn | Aug. 7, 1945 |
| 2,407,511 | Peck | Sept. 10, 1946 |
| 2,424,513 | Stephan | July 22, 1947 |
| 2,428,928 | Cain | Oct. 14, 1947 |
| 2,453,003 | Edwards | Nov. 2, 1948 |
| 2,455,476 | Epstein | Dec. 7, 1948 |
| 2,497,660 | Devine | Feb. 14, 1950 |
| 2,505,736 | Herscher et al. | Apr. 25, 1950 |
| 2,528,973 | Rodman | Nov. 7, 1950 |
| 2,531,509 | Grundmann | Nov. 28, 1950 |

FOREIGN PATENTS

| | | |
|---|---|---|
| 596,432 | Great Britain | Jan. 5, 1948 |